(12) United States Patent
Gapontsev et al.

(10) Patent No.: US 8,254,417 B2
(45) Date of Patent: Aug. 28, 2012

(54) FIBER LASER SYSTEM WITH CONTROLLABLY ALIGNABLE OPTICAL COMPONENTS THEREOF

(75) Inventors: Valentin Gapontsev, Worcester, MA (US); Valentin Fomin, Burbach (DE); Alexander Dronov, Burbach (DE); Dimitri Yagodkin, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 284 days.

(21) Appl. No.: 12/814,603

(22) Filed: Jun. 14, 2010

(65) Prior Publication Data

US 2011/0305249 A1    Dec. 15, 2011

(51) Int. Cl.
*H01S 3/30* (2006.01)
(52) U.S. Cl. .......................................... 372/6
(58) Field of Classification Search ........................ 372/6
See application file for complete search history.

(56) References Cited

U.S. PATENT DOCUMENTS

| | | | |
|---|---|---|---|
| 4,384,203 A | 5/1983 | Wells | |
| 6,997,368 B2 | 2/2006 | Beatson | |
| 2002/0054428 A1* | 5/2002 | Seward | 359/362 |
| 2007/0133931 A1* | 6/2007 | Lee et al. | 385/93 |

FOREIGN PATENT DOCUMENTS

EP    0189966 B1    3/2003

OTHER PUBLICATIONS

International Search Report for Int'l. Application No. PCT/US2011/039706, filed Jun. 9, 2011.

* cited by examiner

*Primary Examiner* — Patrick Stafford
(74) *Attorney, Agent, or Firm* — Yuri Kateshov; Timothy J. King

(57) ABSTRACT

The present disclosure relates to a modular fiber laser system operative to controllably guide a beam which is launched from a feeding fiber into a process fiber so that the high-aperture component is coupled and guided in cladding of the process fiber, and a low-aperture component is coupled into the core of the fiber. The laser system further has a reflective element configured with light-reflecting and light-transmitting portions. The high-aperture component at least partially decouples from the cladding into the core so that the core radiates the high-aperture and low-aperture components. The high-aperture component is incident upon the light-reflecting portion and backreflected into the process fiber so that a sensor array, which is located between the feeding and process fibers, detects the reflected light. The laser system further includes an adjustment system operatively connected to the sensor array and configured to displace the fibers relative to one another to an alignment position after the sensor array detects a maximum signal of the reflected high-aperture component.

20 Claims, 7 Drawing Sheets

FIBER LASER SYSTEM WITH CONTROLLABLY ALIGNABLE OPTICAL COMPONENTS THEREOF

BACKGROUND OF THE DISCLOSURE

1. Field of the Disclosure

The present disclosure relates to fiber laser systems operative to controllably align a beam. More specifically, the present disclosure relates to a system and method for adjustment of beam switches and fiber-fiber couplers using a reflecting element.

2. Discussion of Relevant Art

One of important parameters of fiber laser systems (FLS) is beam quality at the output of the system. The beam quality is a "measure of how tightly a laser beam can be focused under certain conditions (e.g., with a limited beam divergence)" from the *Encyclopedia of Laser Physics and Technology*, 2008. Conventionally, one of the quantifying factors of the beam quantity is "the beam parameter product (BPP), i.e., the product of beam radius at the beam waist with the far-field beam divergence angle" *Encyclopedia of Laser Physics and Technology*, 2008. The optimization of the BPP depends upon, among other factors, the configuration and "correct" location of optical component guiding an incident beam toward a surface to be treated.

Referring now to FIG. 1 there is an illustration of an exemplary fiber laser system 10 having a modular configuration so that at least some components of the system can be disconnected from the rest of the system, if a need arises. The FLS 10 includes a fiber laser 12 generating a laser output, which is coupled into a feeding fiber 14, a delivery system 16, such as a beam switch (BS) or fiber-fiber coupler (FFC), a processing fiber 18 guiding the laser output which is coupled into an end tool 21, such as a laser head.

The delivery system 16 is configured with input and output connectors supporting feeding and processing fibers, respectively. The input connector is fixed to the upstream face of delivery system 16, whereas the output connector is removably mounted to the downstream face and receives a laser output beam through a few, discrete light guiding/focusing optical components of system 16.

In use, the laser output is delivered to laser head 21 configured to process materials. As known to an artisan, laser systems, like system 10, are most efficient when the optical power is concentrated inside the core of processing fiber 18. The optical misalignment between feeding and processing fibers 14 and 18, respectively, which often happens during assembling and/or reassembling FLS 10, leads to the coupling of part of the laser light into the cladding of the processing fiber 18. As a consequence, the BPP of the output light is not minimally optimal and the proper alignment should be reestablished.

As the cladding-guided light propagates along a light path, it is typically partly backreflected. At a certain level, the backreflected light, when detected by fast fiber beam detectors (FFBD) 24, which are mounted to the housing of the delivery system 16, can serve as a reliable indication of proper alignment. Indeed, power of light coupled into the cladding is the power of light not coupled into the core and thus lost at the output of system 10.

The system 10 is being tested and tuned up at a manufacturing facility by using a stationary beam-quality control device 22 operative to determine the minimal value of BPP. The minimal value of the BPP corresponds to a certain position of actuators operative to controllably displace an outer connector 25 which supports processing fiber 18 and is displaceably mounted to the housing of delivery system 16. The optimal position of the actuators means that FFBD 24 should detect deviation of laser beam which, instead of getting coupled into the core of fiber 18, is incident upon the cladding thereof. Having coupled into the cladding, cladding light reflects back and is picked up by FFBD 24. If the backreflected light is within the norm, system 10 continues to operate. Otherwise, the system should be shut down.

Once adjusted, system 10 without, of course, beam-quality control device 22, is delivered to an end user. When the actuators are displaced to the predetermined position in the field, FFBD 24 may malfunction for the reasons explained below and generate a minimal signal that does not correspond to the minimal power loss and optimal BPP. The process fiber 18 has a structure allowing for minimal losses including those in the cladding which cause the decreasing of the scattered light and, therefore, inadequate operation of detectors 24.

This is particularly relevant to the fiber configuration having a cladding which is capable of guiding light; such a configuration may include, but not limited to a multi-cladding fiber widely used in high-power fiber laser systems. Since a cladding typically does not have a heat-absorbing element, the light supported in the cladding may be powerful enough to thermally damage the fiber. In this case, the FFBd sensors 24 do not work properly because there is no back-reflected light from the cladding. Furthermore, FFBD detectors 24 may be mounted to the housing of delivery system 16 such that they are shielded by other parts. As a consequence, delivery system 16 may not properly operate which is turn leads to the misalignment of the optical components.

A need, therefore, exists for a reliable alignment system allowing for the factory-established settings to be easily reproduced when a fiber laser system is in use.

SUMMARY OF THE DISCLOSURE

The need is satisfied by the present disclosure teaching a high power fiber laser system (HPFLS) which is configured to have a reliable alignment of optical components. The disclosed high power fiber laser system is configured with a reflective member which is mounted to a laser head and configured to reflect a high-aperture component of laser output beam so as to facilitate rapid in situ adjustment of the components' alignment by using reflection measurements.

According to one feature of the present disclosure, the reflector is configured to transmit the radiation from the core of a process fiber towards a workpiece. The geometry of the disclosed reflector is further selected so that light supported by the waveguiding cladding is incident on the peripheral region of the reflector operative to reflect at least a portion of the cladding-supported light. The reflected light is sensed at the input of the process fiber by an array of sensors generating a signal which is further used for the displacement of the reflector to the desired position.

According to a further feature of the present disclosure, only a small portion of light incident onto the peripheral region is and further coupled into the process fiber. Otherwise if the reflected light were full coupled into the process fiber, it might cause a serious damage to the fiber itself and further to the overall system.

According to still a further feature of the disclosure, the light incident on the reflector is collimated to have the low-aperture component of the core-emitted radiation propagate through the light-transmitting central region. However, not all light is coupled into the core at the upstream end of the process fiber. A high-aperture component of light is coupled into a waveguiding cladding. As the high-aperture component propagates in the cladding, it gradually couples out of the cladding into the core. When the latter is radiated from the downstream end of the process fiber it is collimated and incident upon the peripheral dispersing region of the reflector. When reflected from the peripheral region, the high-aperture component propagates through the collimator into the core and cladding of the process fiber and guided there in a backward direction.

To detect a sufficiently strong signal of the backreflected component by a sensor array, which is mounted in the delivery system upstream from the upstream end of the process fiber, the reflective element should extend in a plane which is substantially perpendicular to the beam. Accordingly, one aspect of the disclosure is concerned with controllable displacement of the reflective element to the desired position.

In accordance with a further aspect of the disclosure, there is provided an aligning system operative to align the feeding and process fibers. Having displaced the reflective element to the desired position, the alignment system is operative to controllably displace a connector supporting the upstream end of the process fiber. The alignment process continues until the sensor array detects the minimal signal of the high-aperture component of the laser beam backreflected by the reflective element.

The above and other aspects, features and advantages of the present disclosure will become apparent from the following description read in conjunction with the accompanying drawings, in which like reference numerals designate the same elements.

DETAILED DESCRIPTION OF THE PREFERRED EMBODIMENTS

Figure 1:
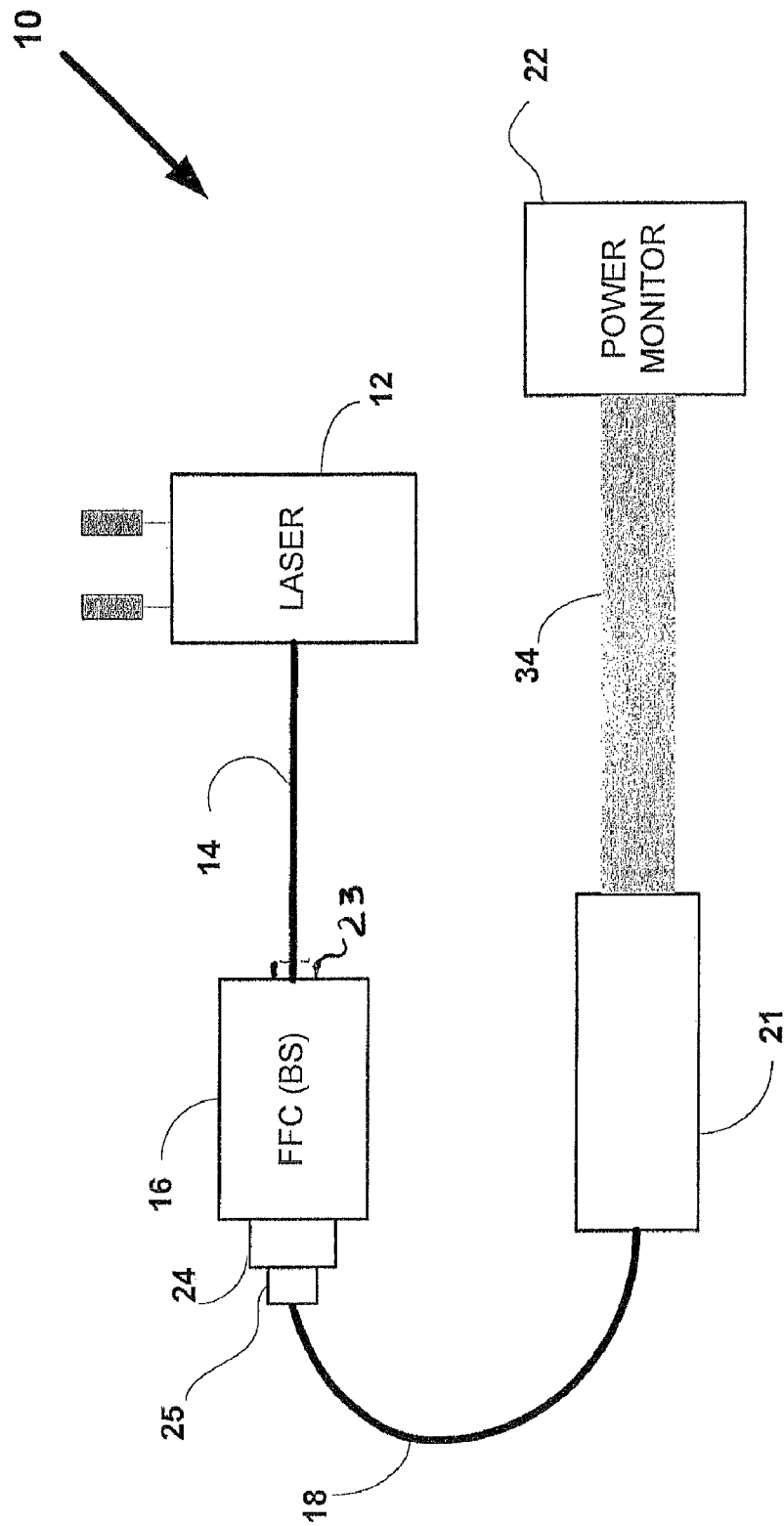
FIG. 1 is an exemplary modular cutting/welding fiber system.

Reference will now be made in detail to several embodiments of the disclosure that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms. may be used with respect to the drawings and not be construed to limit the scope. Unless specifically noted, it is intended that the words and phrases in the specification and claims be given the ordinary and accustomed meaning to those of ordinary skill in the fiber laser arts.

Figure 2:
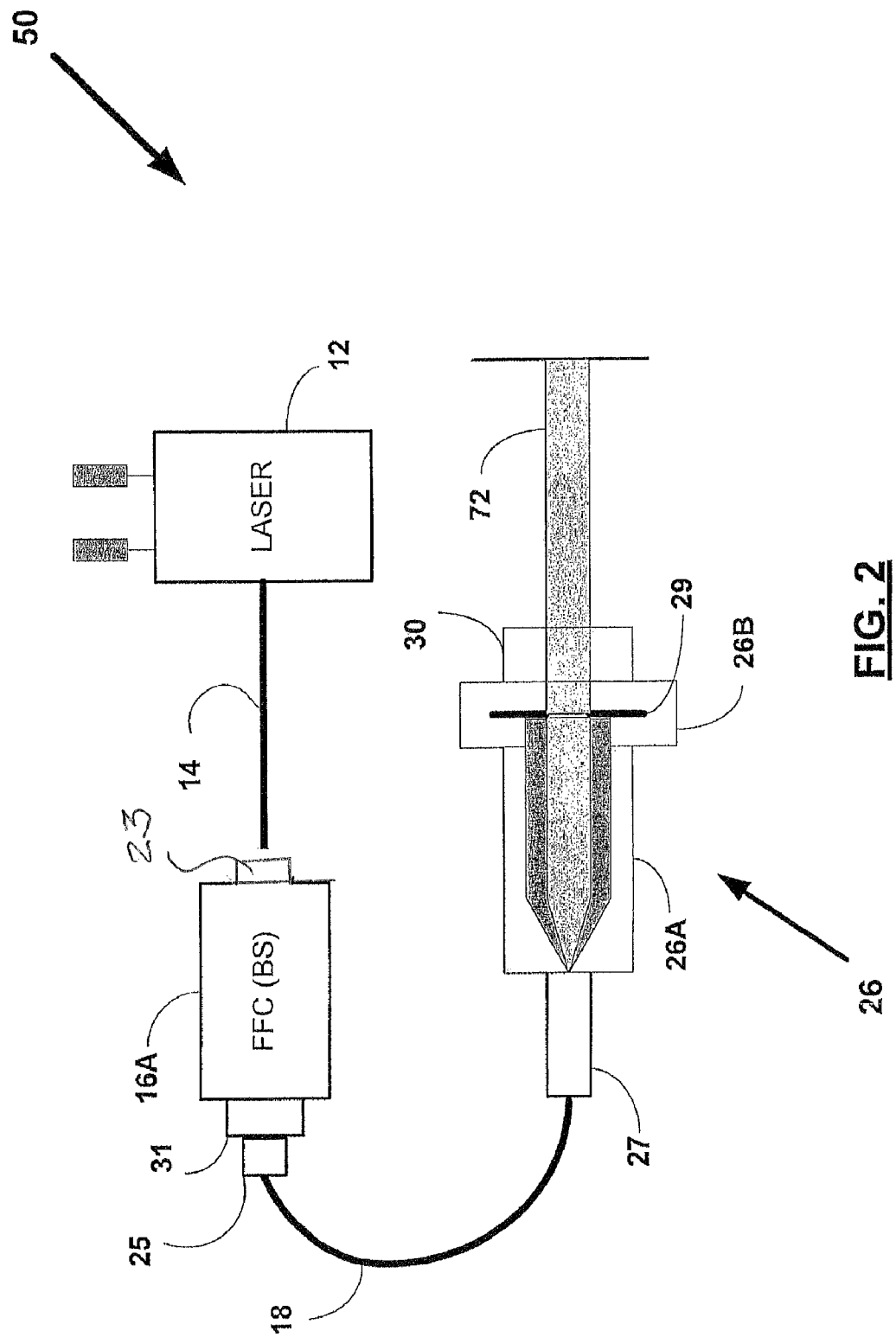
FIG. 2 is a configuration of the proposed system.

Referring now to FIG. 2 an exemplary fiber laser system 50 allows for reliable alignment between feeding and process fibers 14 and 18, respectively, by having a sensor array 31 detect light delivered by process fiber 18 to and reflected back from a reflective element 29. The reflective element 29 is configured so that a radiation emitted from the core of process fiber 18 propagates through the light transmitting central region of element 29. The cladding-guided radiation, typically having an aperture higher than that one of the core, gradually couples into the core and radiated therefrom so as to be incident upon the peripheral, light-reflective or dispersive region of reflective element 29. To provide the coupling of the backreflected light back into the cladding of fiber 18, the incident and backreflected light is collimated. The shape and dimensions of reflective element 29 are so configured that only a portion of the backreflected light is coupled back into the cladding of process fiber 18, as will be disclosed in detail below.

The fiber laser system 50 includes a fiber laser source 12 generating a laser beam in single or multiple modes which are coupled into feeding fiber 14, here having a non-limiting exemplary diameter of 100 mkm. The system 50 further includes an optical delivery system 16A containing beam switches (BS) or fiber-fiber couplers (FFCs). The delivery system 16A is operative to guide the laser beam from feeding fiber 14 to process fiber 18 over a free space. The fibers 14 and 18 are received in respective input 23 and output 25 fiber connectors mounted to the upstream and downstream faces, respectively, of delivery system 16A. The input connector 23 is preferably fixed to the housing of system 16A, whereas output connector 25 is displaceably mounted to system 16A. The latter, as known to one of ordinary skills in the laser arts, has an alignment system that may contain threaded adjustment screws, tension springs, threaded rings, grid adjusters and the like. The manipulation of these system including means for operative movement relative to an X-Y-Z orientation so at provide an alignment between feeding and process fibers 14 and 18, respectively, under the test conditions.

The sensor array 31 including FFBD or other photo sensors is located upstream from output connector 25 in delivery system 16A. The process fiber 18 may be configured as a single-clad fiber but, preferably, double-clad fiber and capable of supporting a single mode or multiple modes. Moreover, the configuration of process fiber 18 provides for minimal light power losses both in the core and cladding(s) at high powers. By way of example only, process fiber 18 here is a passive and preferably multi-mode (MM) double clad fiber with a diameter of 150 mkm.

The process fiber 18 is received by a downstream optical connector 27 of an optical head 26 further containing a collimator system 26A and a reflective element alignment system 26B with reflective element 29. Also, optionally operatively connected to a downstream side of reflective element 29 is a protective glass member 30 preventing the penetration of dust into head 26 from the surface to be treated.

In practice, the misalignment between input and output connectors 23, 25, respectively, of delivery system 16A includes deviation of the laser radiation from the desired path and loss of light power coupled into the core of process fiber 18. The detection of power carried in a beam incident on the surface to be treated requires backreflection thereof sufficient to be picked by a sensor array 31 which is mounted to delivery system 16A next to the upstream end of process fiber 18.

In the prior systems configured with a single clad process fiber, incoming light incident upon the upstream end of process fiber 18 and more specifically, upon the protective cladding tended to scatter. The power of scattered light due to the perfected configuration of process fiber 18 may be insufficient to have sensor array 31 correctly read it. On the other hand, if the known system is configured with a multi-clad fiber, in which inner cladding is waveguiding, it is impossible to determine precisely how much light power is guided along the core and how much is supported by the cladding. All the sensors can read is the total power.

According to the disclosure, the alignments of process and feeding fibers 18 and 14, respectively, includes basic two steps. First, displacement of reflective element 29 to an optimal position in which its surface, impinged upon by the beam, extends substantially perpendicular the beam. The desired position of the reflective element is manifested by a maximum signal detected by array of detectors 31. Note that there is no power limitation at this moment, for example up to 6000 W or more may be used. Second, adjustment of output connector 25 of the optical delivery system 16A so that the upstream end of process fiber 18 assumes an optimal position corresponding to the desired alignment between the fibers and indicated by a minimal signal of backreflected high-aperture light which is detected by array of detectors 31.

When the delivering system 16A directs some part of the laser beam into the cladding of the process-fiber 18, the cladding-supported light will gradually couple into the core. At the output of the core of process fiber 18, thus, the emitted light would have a high-aperture component of light and a low aperture.

According to the disclosure, the high-aperture component which includes from about 2 to 15% of the total light power is returned back to array 31. To tune up system 50 so that sensor array 31 generates a maximum electric signal, it is necessary to position reflective element 29, which is removably mounted to optical head 26, substantially perpendicular to the beam. In particular, reflective element 29 is configured to reflect only a high-aperture component of the laser beam, a low aperture component is transferred as an output beam 72 to the surface to be treated.

Figure 3:
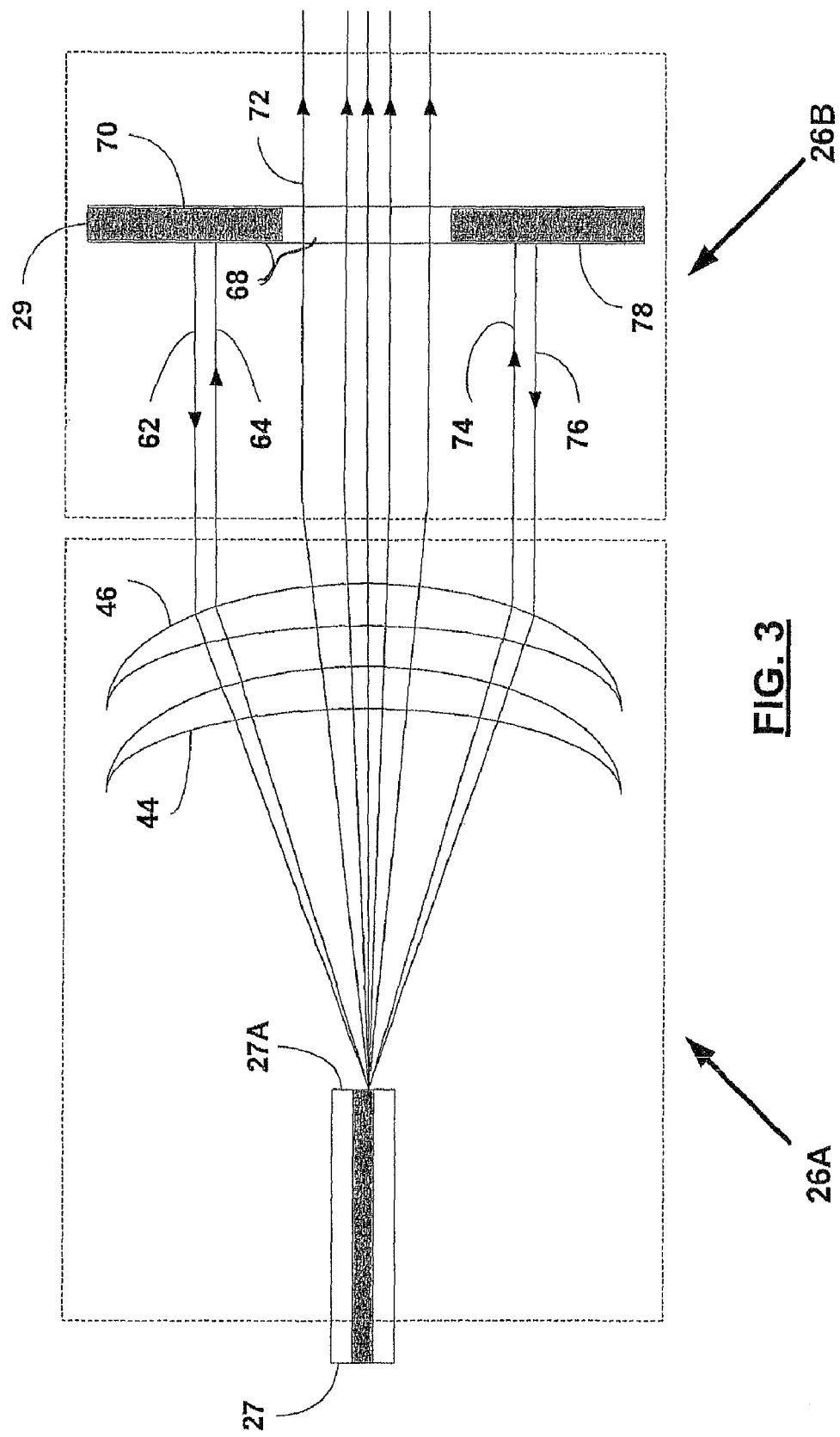
FIG. 3 is a partial view of components of the proposed system in FIG. 2.
Figure 4A:
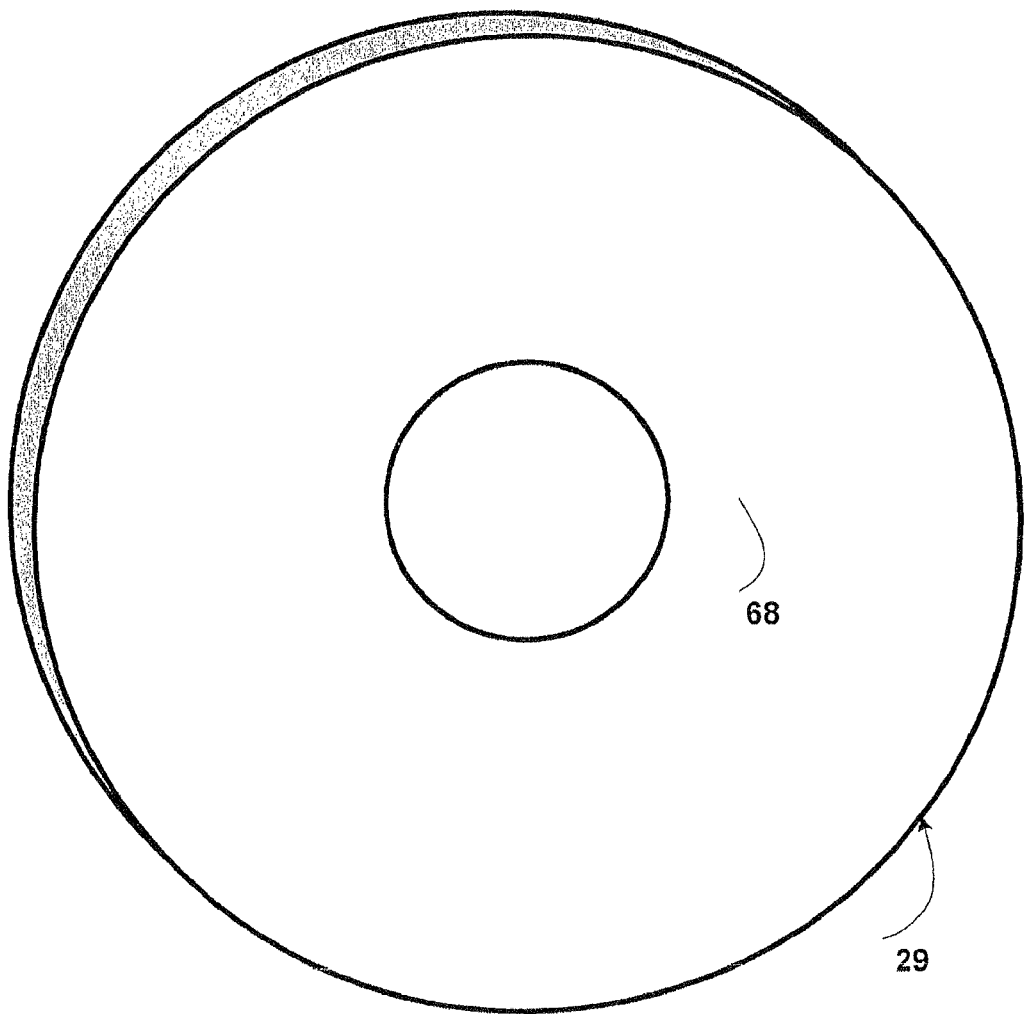
FIGS. 4A, 4B, and 4C are alternative constructions of the reflective element.

Referring to FIGS. 3 and 4A, reflecting element 29 is provided as a cylindraceous shape, having, by way of example, an outer diameter of 50 mm, and made from fused silica, although any other suitable material or shape may be employed within the scope and spirit of the present disclosure. The downstream surface 70 (FIG. 3) is uncoated with anti-reflecting coating completely and on an upstream surface 78 only a portion 68 of the surface is coated forming a ring having an inner diameter of 17 mm, creating a sort of annular mirror. This provides a correspondent of the numerical aperture (N.A.)=70 mrad. (for collimator F=120 mm). Hence, in this embodiment, reflective element has a reflection of about 4% for N.A.>70 mrad and no reflection for a lower aperture.

Figure 4B:
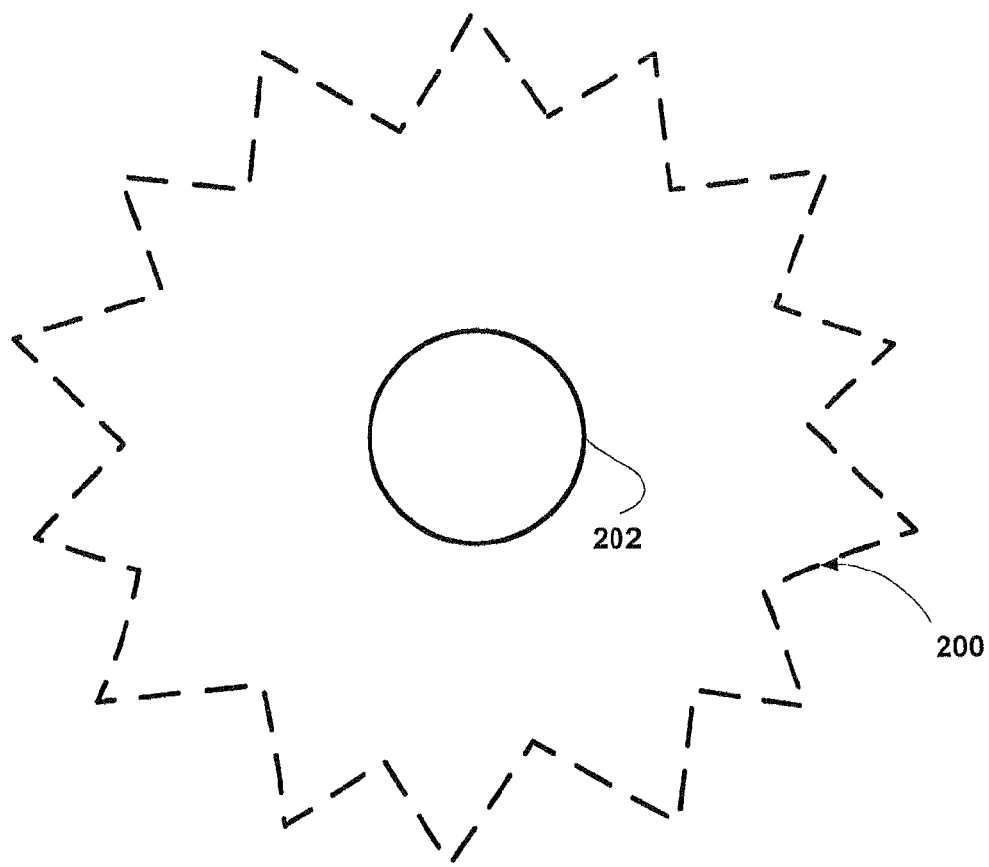
Figure 4C:
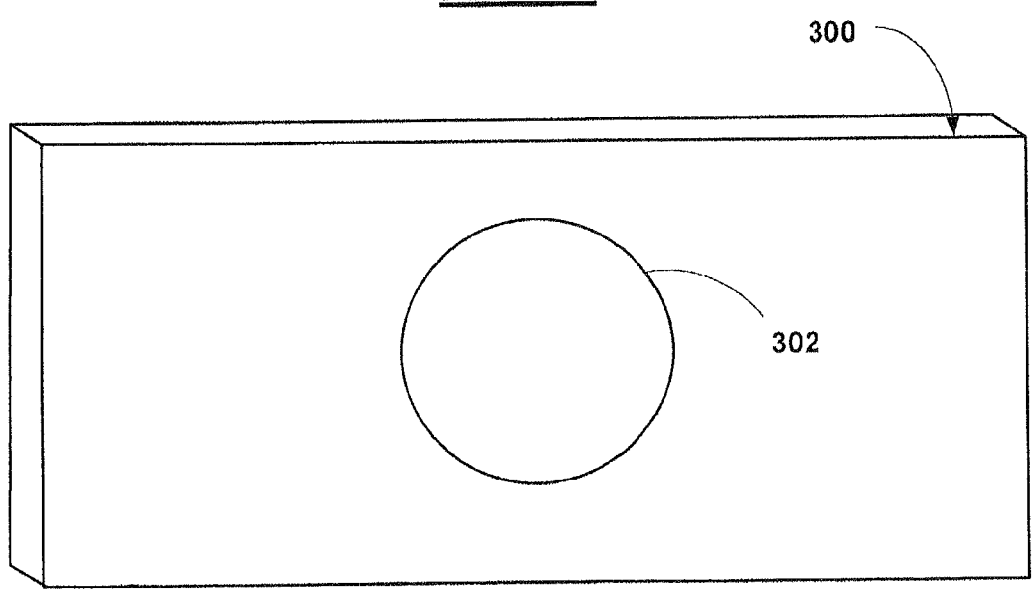

FIG. 4B illustrates one of unlimited alternative shapes of reflecting element 200 formed with a light-transferring portion 202 and a star-shaped reflective portion sufficient to achieve the functions of the proposed disclosure. For a second alternative construction, referring now to FIG. 4C, a rectilinear (six-sided) reflecting element 300, having a light transferring portion 202, may be employed without departing from the scope and spirit of the present disclosure. The reflective element 29 also can have a concave configuration and has a diameter varying between about 8 and 20 mm, with a diameter of about 16.8-17 mm being particularly advantageous.

Turning back to FIG. 3, collimator system 26A contains a collimator unit 44, 46, respectively configured to collimate both high- and low-aperture components of the laser beam emitted from a fiber end 27A of process fiber 27. The high-aperture light component 64 and 74 is incident on a peripheral region of reflecting upstream face 78 of element 29 so that high-aperture backreflected light 62 and 76 are again collimated so as be coupled back into the cladding of fiber 27. The backreflected high-aperture component is further detected by FFBD or other photodetectors 31 (FIG. 2) of the delivery system as it leaves the upstream end of fiber 27. The low-aperture light component 72 propagates through light transmitting portion 68 and is incident on the surface to be treated. The downstream face 70 of element 29 may be configured to block propagation of backreflected light from the surface to be treated towards fiber 27 and further upstream.

The sensor array 31 in delivery system 16A detects reflected high aperture beam component. Importantly, it has been found that when reflective component 29 is positioned substantially perpendicular to the collimated laser beam, a backreflected signal is high enough to provide a sufficient information for sensor array 31.

Figure 5:
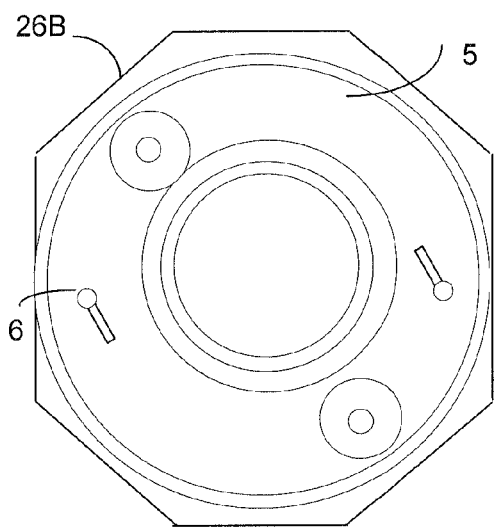
FIG. 5 is a front view of one embodiment of a reflective alignment system.
Figure 6:
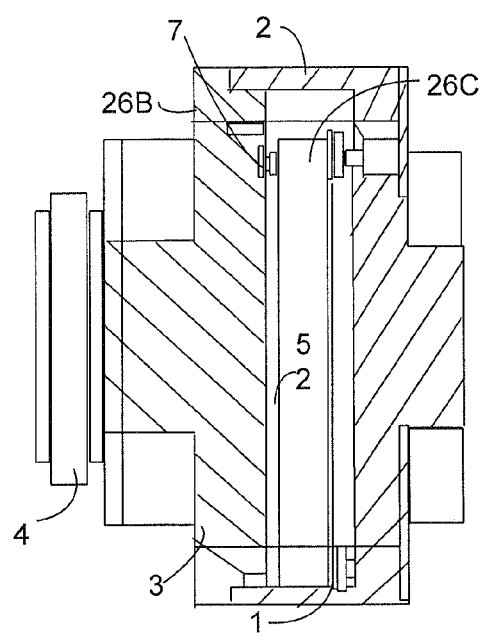
FIG. 6 is a sectional view of FIG. 5 along line I-I.
Figure 7:
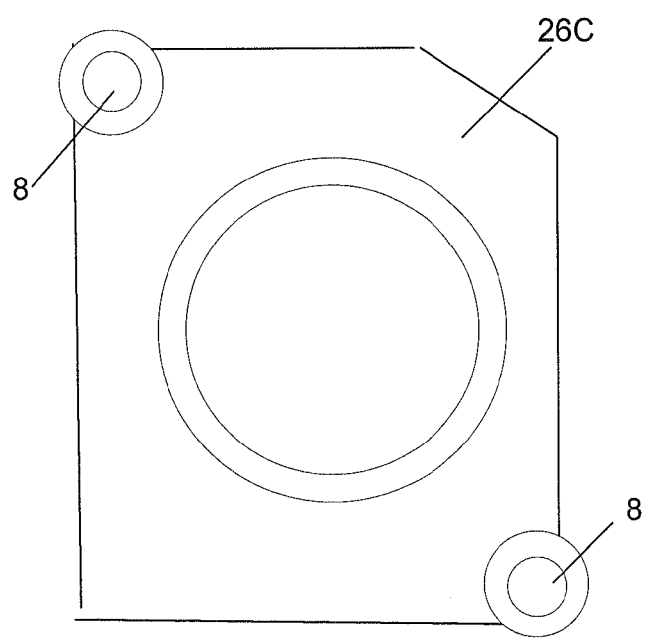
FIG. 7 is a front view of an adjustable reflective element holder retained in the reflective alignment system.
Figure 8:
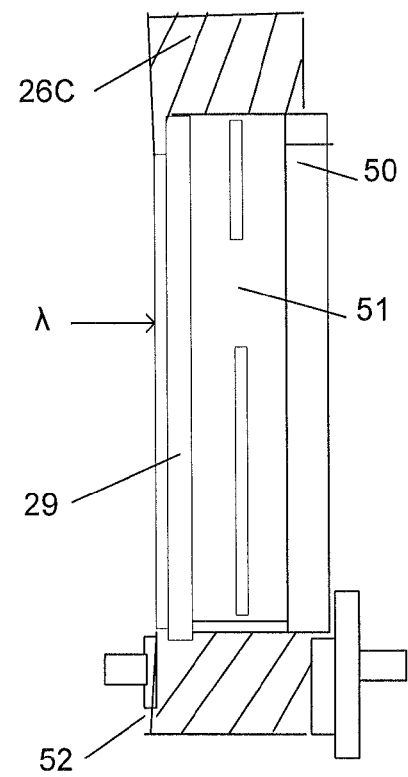
FIG. 8 is a sectional view of FIG. 7 along line II-II.

Referring now to FIGS. 5, 6 (a section I-I of FIG. 5), 7, and 8 (a section II-II of FIG. 7), that provide detailed construction images of the reflective alignment system 26B. Reflective alignment element system 26B includes internally a removable and adjustable reflective element holder 26C for adjustably supporting reflecting element 29 relative to the laser beam indicated as λ in FIG. 8 laser beam. Reflective element holder 26C includes multiple adjustment screws 8, 8 (and others not shown), a threaded ring 50 for securing, an adjustment spring 52 and an element spring 51 which in combination enable adjustment and retention of reflective element 29.

Similarly included in reflective alignment element system 26B, are a housing 2 and a mount 3, a threaded flange 4 to secure collimator system 26A, a protective plate 5, a movement rest 7, a ball 10, and a plurality of adjustment screws and washers collectively at 6 to allow operative adjustment during use. Through adjustment of the noted elements, one of skill in the art of alignment systems and related fiber laser systems will readily recognize that a complete and secure alignment means involving the correct orientation is achieved.

Referring again to FIG. 2, once the desired position of reflective element 29 is established, which is indicated by the maximum signal received (and output) by sensor array 31, the user may further manipulate the adjustment system within delivery system 16A of FIG. 2 operative to displace output connector 25 so that process fiber 18 is in alignment with feeding fiber 14. Typically, as known to one of ordinary skills, such an adjustment system may include variously configured actuators which are operative to displace connector 25 in an X-Y-Z system of coordinates. The alignment is established when the light signal received by sensor array 31 is minimal. At this point, the actuators are in an optimal position corresponding to the alignment between the feeding and process fibers.

It is to be specifically understood that the disclosure is not limited to those precise embodiments and may be effectively used with multiple process fibers. Furthermore, various changes, modifications, and adaptations may be effected therein by one of ordinary skill in the operative and analytical fiber laser arts relating to beam development and guiding without departing from the scope or spirit of the disclosure as defined in the appended claims.

What is claimed is:

1. A fiber laser system comprising:
    a beam delivery system configured to guide a laser beam from a feeding fiber to a process fiber, the process fiber having a light-guiding cladding surrounding a core which is operative to output high- and low-aperture components of the laser beam;
    a reflective element spaced downstream from the process fiber and configured to transmit the low-aperture component and at least partially reflect the high-aperture component; and
    a sensor array located between the feeding and process fibers in the beam delivery system and operative to detect the backreflected high-aperture component.

2. The fiber laser system of claim 1, wherein the reflective element is displaceable to an optimal position in which the sensor array is operative to detect a maximal signal of the backreflected high-aperture component of the laser.

3. The fiber laser system of claim 2, wherein the beam delivery system has:
 an adjusting system operatively connected to and configured to displace the process and feeding fibers relative to one another to an alignment position in which the sensor array is operative to detect a minimal signal of the backreflected high-aperture component from the reflective element located in the optimal position, and
 at least one of a beam switch and a fiber-fiber coupler.

4. The fiber laser system of claim 2 further comprising a modular alignment system operatively connected to an output end of the process fiber and including the reflective element, the alignment system including
 a collimating optics between the output end of the process fiber and the reflective element so that the laser beam incident on and reflected from the reflective element is collimated; and
 a positioning system including a plurality of actuators, the actuators being operative to displace the reflective element to the optimal position in which the reflective element extends substantially perpendicular to the optical axis of the alignment system.

5. The fiber laser system of claim 1 further comprising
 a fiber laser source generating the beam coupled into the feeding fiber,
 an input connector supporting the output end of the feeding fiber and fixed to an upstream end of the delivery system,
 an output connector displaceably mounted to a downstream end of the beam delivery system and supporting the input end of the process fiber.

6. The fiber laser system of claim 1, wherein the process fiber has a multiclad configuration with the light-guiding cladding surrounding a core, the cladding and core being configured to support the high- and low-aperture components, respectively.

7. The fiber laser system of claim 1, wherein the reflective element includes a peripheral reflecting region impinged upon by the high-aperture component, and light-transmitting region surrounded by the peripheral region and configured to transmit the low-aperture component.

8. The fiber laser system of claim 7, therein the reflective element is configured to reflect from about 1% to about 7% of the high-aperture component for N.A>70 mrad, a diameter varying between about 8 and about 20 mm and an upstream face dispersing the rest of the high-aperture component which is incident upon the upstream face.

9. The fiber laser system of claim 2, wherein the reflective element is removably mounted to the modular alignment system, thereby allowing use of an alternative reflecting element.

10. The fiber laser system of claim 1 further comprising a fiber laser source is configured to generate the beam selected from a single mode beam and a multimode beam.

11. A fiber laser system operative generate a laser beam, comprising:
 a beam delivery system passing a beam from a feeding fiber to a process fiber;
 a modular alignment system removably coupled to the process fiber including a reflective element alignment module;
 the modular alignment system operative to receive an incoming collimated beam from the beam delivery system and to backreflect a high-aperture component of the incoming beam back along the process fiber to the beam delivery system; and
 a sensor array in the beam delivery system operative to sense the backreflected component, thereby allowing adjustment of the beam delivery system to minimize the high aperture component and guide the beam along the process fiber.

12. The system of claim 11, wherein the reflecting element alignment module further comprises a reflective element provided with a light-reflecting portion and a light-transmitting portion, the high-aperture component of the beam being launched into a waveguiding cladding of the process fiber and at least partially decoupling therefrom into a core of the process fiber which guides a low-aperture component of the beam so that the core outputs the low-aperture component, transmitted substantially losslessly through the light-transmitting portion, and the high-aperture component incident on and reflected from the light-reflecting portion.

13. The system of claim 11 further comprising:
 at least one of a beam switch and a fiber-fiber coupler in the beam delivery system; and
 at least one FFBD sensor coupled to the sensor array.

14. The system of claim 12 further comprising a positioning system in the reflective element alignment system for adjusting the reflecting element to maximize the backreflected high-aperture component sensed by the sensor array during the use.

15. The system of claim 14, further comprising a collimator in the modular alignment system optically coupled to the reflective element alignment module and operative to couple the backreflected high-aperture component into the process fiber.

16. The system, according to claim 14 further comprising an adjusting system operative to adjust the beam relative to the process fiber to minimize the backreflected high-aperture component sensed by the sensor array.

17. The system of claim 11, wherein the process fiber is a double clad fiber.

18. The system of claim 4, wherein the reflective element in the reflective element alignment module reflects from about 1% to about and 7% of the high-aperture component and substantially 0% of the low-aperture component of the beam.

19. The system of claim 16 further comprising a system for operative replacement of the reflecting element from the reflecting element alignment module, thereby allowing use of an alternative reflecting element.

20. The system of claim 12 further comprising
 one of a focusing optic and a protective member operatively coupled to the reflecting element alignment module; and
 the at least one of the focusing optic and the protective member enabling a simultaneous measurement of a beam parameter product (BPP) during the use.

* * * * *